United States Patent [19]

Watanabe et al.

[11] Patent Number: 4,965,323
[45] Date of Patent: Oct. 23, 1990

[54] METHOD OF VULCANIZING RUBBER AT PH 5 TO 10

[75] Inventors: Noboru Watanabe; Yoichiro Kubo, both of Yokohama, Japan

[73] Assignee: Nippon Zeon Co., Ltd., Tokyo, Japan

[21] Appl. No.: 57,702

[22] Filed: Jun. 1, 1987

Related U.S. Application Data

[63] Continuation of Ser. No. 765,723, Aug. 15, 1985, abandoned, which is a continuation-in-part of Ser. No. 610,971, May 16, 1984, abandoned.

[30] Foreign Application Priority Data

May 17, 1983 [JP] Japan .................................. 58-84928

[51] Int. Cl.$^5$ .......................... C08C 19/20; C08K 5/14
[52] U.S. Cl. ..................................... 525/349; 525/352; 525/387
[58] Field of Search ............... 525/349, 352, 387, 338, 525/339

[56] References Cited

U.S. PATENT DOCUMENTS

| | | | |
|---|---|---|---|
| 3,700,637 | 10/1972 | Finch, Jr. | 525/339 |
| 3,872,072 | 3/1975 | Halasa | 525/339 |
| 4,337,329 | 6/1982 | Kubo | 525/339 |
| 4,384,081 | 5/1983 | Kubo | 525/339 |
| 4,404,329 | 9/1983 | Maeda | 525/349 |
| 4,452,951 | 6/1984 | Kubo | 525/339 |
| 4,464,515 | 8/1984 | Rempel | 525/338 |
| 4,656,219 | 4/1987 | Oyama | 524/481 |

OTHER PUBLICATIONS

Chem. Abst., 73, 569–586 (1970).

*Primary Examiner*—Christopher Henderson
*Attorney, Agent, or Firm*—Sherman and Shalloway

[57] ABSTRACT

A rubber composition comprising a nitrile group-containing hydrocarbon rubber and a vulcanizing system, characterized in that the iodine value of said rubber does not exceed 120 and the pH of the tetrahydrofuran solution of said rubber is at least 5.

4 Claims, No Drawings

METHOD OF VULCANIZING RUBBER AT PH 5 TO 10

This application is a continuation of application Ser. No. 765,723 filed Aug. 15, 1985 now abandoned, which is a continuation-in-part application Ser. No. 610,971 filed on May 16, 1984 now abandoned.

This invention relates to a vulcanizable rubber composition having an improved compression set.

Nitrile group-containing hydrocarbon rubbers such as acrylonitrile-butadiene copolymer rubber (NBR) in which part or the whole of the butadiene units have been hydrogenated or substituted by other ethylenic monomers have excellent ozone resistance, heat resistance and oil resistance. Since their double bond content is reduced, however, they have the defect that their vulcanizates, whether they are obtained with a sulfur vulcanization system or an organic peroxide vulcanization system, have a much greater compression set than ordinary NBR, for example. Because the compression set is essential to oil-resistant rubbers and the above tendency increases as the degree of unsaturation decreases, it is necessary to provide an improvement on this shortcoming.

If practicality was to be ignored, this situation could be improved in the following manner. In the case of the employment of the sulfur vulcanizing system, an improvement can be achieved by carrying out a heat treatment for a prolonged period of time following the vulcanization under the usual vulcanizing conditions. On the other hand, in the case where an organic peroxide vulcanizing system is used, an improvement can be obtained by using the vulcanizing agents in amounts much more than usual and raising the vulcanizing temperature as well as prolonging the vulcanizing time. Needless to say, there is however a limit to which such methods can be employed.

The object of this invention is to provide a vulcanizable composition consisting of a nitrile group-containing hydrocarbon rubber by the use of which there can be provided vulcanizates having an improved compression set without employing such extreme vulcanizing conditions as described above but by the employment of practical vulcanizing conditions.

The object of this invention can be achieved by using a nitrile group-containing hydrocarbon rubber composition comprising a nitrile group-containing hydrocarbon rubber and a vulcanizing system in which the rubber has an iodine value of not more 120 and the pH of a tetrahydrofuran solution of said rubber is at least 5.

It becomes possible by the use of the aforesaid rubber to obtain vulcanizates of improved resistance to compressive deformation by carrying out the vulcanization under practical conditions regardless of whether the vulcanization is carried out with a sulfur vulcanizing system or an organic peroxide vulcanizing system.

The expression "the pH of a tetrahydrofuran solution of the nitrile group-containing hydrocarbon rubber" (at times, referred to hereinafter as simply pH of the rubber), as used herein, denotes a pH value determined in the following manner. After dissolving 3 grams of the rubber in 100 milliliters of tetrahydrofuran, 1 milliliter of water is added with thorough stirring. The pH value of the solution is then measured at 20° C. with a glass electrode pH meter.

In general, such nonrubber ingredients as catalysts, emulsifiers and coagulants that are used at the time of producing the rubber remain in the nitrile group-containing hydrocarbon rubber, and thus the solution of this rubber shows an optional pH. The pH of the nitrile group-containing hydrocarbon rubber used in this invention must be at least 5 for achieving the object of the invention. An improvement of the compression set cannot be obtained with a pH of less than 5. The pH is preferably at least 5.5, and more preferably at least 6.0.

As a method of adjusting the pH of the rubber to at least 5 in this invention, there can be mentioned, such methods as that of bringing the rubber after polymerization or hydrogenation into contact with an alkaline substance such as sodium hydroxide or potassium hydroxide or an organic base such as an amine; that of adjusting the pH of hydrogenation system containing the rubber; or that of combination of these two methods. Specifically, there is, for example, a method in which subsequent to the polymerization or hydrogenation reaction the polymer solution is contacted with an aqueous alkaline solution, and thereafter the rubber is recovered; a method in which crumbs of rubber separated from a polymer latex, polymer solution or hydrogenated polymer solution are washed in an aqueous alkaline solution; a method in which a polymer whose pH has been previously adjusted with alkaline substances is hydrogenated or the pH of the polymer solution is adjusted by the alkaline substances; or a method in which the alkaline substances are added to the polymer after polymerization or hydrogenation.

In view of the requirement of oil resistance of the rubber of this invention, the content of the units derived from unsaturated nitriles in the rubber is usually from 10 to 60% by weight, more preferably from 20 to 45% by weight. Further, for ensuring that the vulcanizate using the composition of this invention possesses superior resistance to ozone and heat, the iodine value of the rubber must be in the range of 0 to 120. While the compression set can be improved when the iodine value of the rubber exceeds 120, there is an undesirable decline in the heat resistance of the rubber. The iodine value of the rubber is preferably from 0 to 80, and more preferably from 0 to 40. The iodine value is determined in accordance with the JIS K 0070.

Preferred examples of the nitrile group-containing hydrocarbon rubber of this invention are the unsaturated nitrile/conjugated diene copolymer rubber whose conjugated diene units have been hydrogenated; the unsaturated nitrile/conjugated diene/ethylenically unsaturated monomer terpolymer rubber and this rubber whose conjugated diene units have been hydrogenated; the unsaturated nitrile/ethylenically unsaturated monomer copolymer rubber, etc. These nitrile group-containing hydrocarbon rubbers can be obtained by employment of the usual polymerization technique and the usual hydrogenation method. It goes without saying that the method per se of producing the rubber is imposed no particular restriction.

Examples of the monomers usable in producing the nitrile group-containing hydrocarbon rubber of this invention are given below.

The unsaturated nitriles include such compounds as acrylonitrile and methacrylonitrile. As the conjugated dienes, there can be mentioned such dienes as butadiene, 2,3-dimethylbutadiene, isoprene and 1,3-pentadiene. The ethylenically unsaturated monomers include the unsaturated carboxylic acids such as acrylic acid, methacrylic acid, itaconic acid and maleic acid and the salts of these acids; the alkyl esters of the aforesaid carboxylic acids such as methyl acrylate and 2-ethylhexyl acrylate; the alkoxyalkyl esters of the aforesaid unsaturated carboxylic acids such as methoxy acrylate, ethoxyethyl acrylate and methoxyethoxyethyl acrylate; (meth)acrylamide; the N-substituted (meth)acrylamides such as N-methyl(meth)acrylamide, N,N'-dimethyl(meth)-acrylamide, N-methylol(meth)acrylamide and sodium taurine-(meth)acrylamide. The unsaturated nitrile/ethylenically unsaturated monomer copolymer rubber may be one in which a part of the unsaturated monomer has been substituted by a nonconjugated diene such as vinylnorbornane, dicyclopentadiene, 1,4-hexadiene, etc., and copolymerized.

Specific examples of the nitrile group-containing hydrocarbon rubber of this invention are hydrogenation product of butadiene/acrylonitrile copolymer rubber, isoprene/acrylonitrile copolymer rubber and butadiene/isoprene/acrylonitrile copolymer rubber; the butadiene/methyl acrylate/acrylonitrile copolymer rubber, butadiene/acrylic acid/acrylonitrile copolymer rubber, the butadiene/ethylene/acrylonitrile copolymer rubber and a hydrogenation product thereof; butyl acrylate/ethoxyethyl acrylate/vinylchloroacetate/acrylonitrile copolymer rubber, and butyl acrylate/ethoxyethyl acrylate/vinylnorbornane/acrylonitrile copolymer rubber.

These copolymer rubbers can be used either alone or with another rubber, if required, without departing from the spirit and scope of this invention.

There is imposed no particular restriction as to the vulcanizing system to be incorporated in the nitrile group-containing hydrocarbon rubber of this invention, and any of the sulfur or organic peroxide vulcanizing systems that are usually used in the rubber art will do.

In the case of the sulfur vulcanizing system, sulfur and/or a sulfur-donor compound is used as the vulcanizing agent combined with the various vulcanization accelerators and activators.

The sulfur-donor compounds include the thiuram-type compounds such as tetramethylthiuram disulfide, tetraethylthiuram disulfide and dipentamethylenethiuram tetrasulfide; the morpholine-type compounds such as morpholine disulfide and 2-(4-morpholinodithio) benzothiazole; and the sulfur-imparting compounds that release active free sulfur on heating, such as selenium dimethyldithiocarbamate, selenium diethyldithiocarbamate, alkylphenol disulfide and the aliphatic polysulfide polymers.

As vulcanization activators, there can be mentioned such metal oxides as zinc oxide and magnesium oxide, as well as stearic acid, oleic acid and zinc stearate.

The vulcanization accelerators include, for example, the guanidine-type accelerators such as diphenylguanidine; thiazole-type accelerators such as mercaptobenzothiazole and dibenzothiazyl disulfide; sulfenamide-type accelerators such as N-cyclohexyl-2-benzothazylsulfenamide and N,N'-dicyclohexyl-2-benzothiazylsulfenamide; thiuram-type accelerators such as tetramethylthiuram monosulfide and tetramethylthiuram disulfide; and dithiocarbamate accelerators such as zinc dimethyldithiocarbamate.

The amounts in which these vulcanizing agents, vulcanization activators and vulcanization accelerators are used are also imposed no particular restrictions, and they may be used in such amounts as they are usually used.

As the organic peroxides, usable are, for example, such as dicumyl peroxide, cumene hydroperoxide, benzoyl peroxide, 2,4-dichlorodibenzoyl peroxide, 2,5-dimethyl-2,5-di(t-butylperoxy)hexane, 2,5-dimethyl-2,5-di(t-butylperoxy)hexane-3,t-butylperoxybenzoate and 2,5-dimethyl-2,5-di(benzoylperoxy)hexane.

The crosslinking co-agents include such polyfunctional monomers as triallyl cyanurate, triallyl isocyanurate, trimethylol-propanetrimethacrylate, ethylenedimethacrylate, divinylbenzene, diallyl phthalate, toluylene bismaleimide and metaphenylene bismaleimide; and such oxime compounds as p-quinme dioxime and p,p'-dibenzoyl quinone dioxime.

The amounts in which the organic peroxide and crosslinking co-agents are used are also imposed no particular restrictions, and these ingredients may be used in their usually used amounts.

The rubber composition of this invention is produced by kneading by using a conventional mixer such as rolls and a Banbury mixer, a nitrile group-containing hydrocarbon rubber having a pH of at least 5 and an iodine value not exceeding 120 and either a sulfur vulcanizing system or an organic peroxide vulcanizing system and, in accordance with the object to be achieved, such reinforcing agents (e.g. carbon black of various grades, silica, etc.) and fillers (e.g. calcium carbonate, talc, etc.) as well as plasticizers, processing aids, anti-oxidants and other compounding ingredients. Then, the thus obtained rubber composition of this invention is molded into a desired shape, say directly into a sheet or a sheet interlaid with a metallic reinforcing layer, fibrous reinforcing layer, etc., or into the form of a hose, tube or belt, using the usually employed molding machines, following which the molded article is vulcanized by such means as press vulcanization or open cure to give the intended rubber product.

The vulcanizate made from the rubber composition of this invention not only has ozone resistance and heat resistance, which are characteristics of the nitrile group-containing hydrocarbon rubber, but also has been improved in its resistance to compressive deformation and resistance to cold. Hence, it finds a wide range of applications, including its use for various sealing materials such as O-rings, packings, gaskets, etc., various hoses, diaphragms, valves, various belts such as timing belts, belts for oil shale, etc., parts of hydraulic equipment, and packers and blow out preventors for gas and oil wells.

The following examples will serve to illustrate the present invention more specifically.

EXAMPLE 1

Hydrogenated NBR (iodine value 31) was prepared by dissolving an emulsion polymerized NBR (amount of bound acrylonitrile 33% by weight) in methyl isobutyl ketone (NBR concentration 5% by weight) and using a palladium-carbon catalyst. The hydrogenated NBR crumbs separated by steam stripping were washed in aqueous caustic soda solutions of varying degrees of concentration to give five hydrogenated NBR having different pH. In like manner, crumbs of NBR (amount of bound acrylonitrile 33% by weight) prepared by emulsion polymerization in customary manner were washed in aqueous alkaline solutions to give six NBR having different pH.

The above hydrogenated NBR and NBR were used, and compounded rubber compositions were prepared by mixing 100 parts by weight of each of the rubbers, 40 parts by weight of FEF carbon black, 5 parts by weight zinc oxide No. 1, 8 parts by weight (4 parts by weight in the case of NBR) of dicumyl peroxide (purity 40% by weight) and 1 part by weight of stearic acid, after which the rubber compositions were press vulcanized at 160° disulfide and 1.5 parts by weight of cyclohexylbenzothiazylsulfenamide instead of dicumyl peroxide. The results obtained are shown in Table 2.

TABLE 2

| Properties tested | Hydrogenated NBR | | | | | NBR | | | | | |
|---|---|---|---|---|---|---|---|---|---|---|---|
| | Run No. | | | | | | | | | | |
| | Comparative Example | | Invention Example | | | Referential Example | | | | | |
| | 1 | 2 | 3 | 4 | 5 | 6 | 7 | 8 | 9 | 10 | 11 |
| pH of rubber | 3.9 | 4.5 | 5.3 | 6.0 | 10 | 4.0 | 4.5 | 4.8 | 5.5 | 5.9 | 10 |
| Vulcanization properties | | | | | | | | | | | |
| Vulcanization time (min) | 60 | 60 | 30 | 15 | 15 | 20 | 20 | 20 | 20 | 20 | 20 |
| Tensile strength (kg/cm$^2$) | 39 | 37 | 268 | 323 | 356 | 116 | 126 | 131 | 139 | 129 | 128 |
| Elongation (%) | 840 | 850 | 330 | 370 | 330 | 370 | 380 | 350 | 350 | 340 | 350 |
| Tensile stress at 100% (kg/cm$^2$) | 14 | 13 | 57 | 68 | 75 | 42 | 42 | 44 | 47 | 46 | 48 |
| Hardness (JIS) | 53 | 54 | 73 | 73 | 75 | 68 | 69 | 68 | 69 | 67 | 68 |
| Compression set (%) | | | | | | | | | | | |
| 100° C. × 70 hrs. | 84 | 87 | 20 | 15 | 13 | 18 | 18 | 19 | 14 | 13 | 14 |
| 150° C. × 70 hrs. | 98 | 96 | 29 | 26 | 24 | 43 | 41 | 39 | 37 | 36 | 36 |
| Changes in the test piece (*1) | O | O | O | O | O | X | X | X | X | X | X |

(*1) Changes observed in the test pieces after the test. O: No change X: Cracks observed C. The vulcanization properties as measured in accordance with JIS K 6301 are shown in Table 1.

Further, two hydrogenated NBR were prepared with a pH adjusted by the following two methods.

(1) An excessive amount of a NaOH aqueous solution having a pH of 12.5 was added to a solution after a hydrogenation reaction to obtain a hydrogenated NBR crumb. The pH of the rubber after drying was 6.0.

(2) After KOH (3000 ppm/NBR 1 g) was added to the NBR solution before hydrogenation, hydrogenation was conducted with the addition of a catalyst. The hydrogenated NBR was separated from the reaction solution by steam stripping and dried. The pH of the resulting rubber was 5.3.

The vulcanization properties were likewise measured for the two hydrogenated NBRs, and the results in Runs Nos. 3 and 4 at Table 1 were reproduced respectively.

EXAMPLE 3

Comparison was made of the vulcanization behaviors of NBR whose pH of rubber was either 4.5 or 6.0 but having different iodine values (the amount of bound acrylonitrile 33% by weight in all instances), butadiene/butyl acrylate/acrylonitrile terpolymer rubber, and a hydrogenated product of said terpolymer rubber. The same compounding recipe as used in Example 1 was used but changing the amount of dicumyl peroxide (purity 40% by weight) mentioned in example 1 to those shown in Tables 3-1 and 3-2. The results obtained are shown in Tables 3-1 and 3-2.

As is apparent from the results shown in Tables 3-1 and 3-2, when the pH of the rubber is without the range specified by the present invention, a fully satisfactory state of vulcanization cannot be achieved with practical vulcanizing conditions when the iodine value is small,

TABLE 1

| Properties tested | Hydrogenated NBR | | | | | NBR | | | | | |
|---|---|---|---|---|---|---|---|---|---|---|---|
| | Run No. | | | | | | | | | | |
| | Comparative Example | | Invention Example | | | Referential Example | | | | | |
| | 1 | 2 | 3 | 4 | 5 | 6 | 7 | 8 | 9 | 10 | 11 |
| pH of rubber | 3.9 | 4.5 | 5.3 | 6.0 | 10 | 4.0 | 4.5 | 4.8 | 5.5 | 5.9 | 10 |
| Vulcanization Properties | | | | | | | | | | | |
| Vulcanization time (min) | 60 | 60 | 45 | 15 | 15 | 20 | 20 | 20 | 20 | 20 | 20 |
| Tensile strength (kg/cm$^2$) | 38 | 32 | 280 | 295 | 324 | 133 | 142 | 139 | 151 | 162 | 165 |
| Elongation (%) | 870 | 890 | 470 | 450 | 350 | 420 | 400 | 380 | 340 | 330 | 330 |
| Tensile stress at 100% (kg/cm$^2$) | 9 | 10 | 40 | 43 | 57 | 33 | 32 | 33 | 37 | 38 | 38 |
| Hardness (JIS) | 51 | 53 | 71 | 70 | 74 | 61 | 61 | 60 | 62 | 63 | 64 |
| Compression set (%) | | | | | | | | | | | |
| 100° C. × 70 hrs. | 73 | 71 | 14 | 11 | 10 | 15 | 14 | 15 | 12 | 12 | 12 |
| 150° C. × 70 hrs. | 95 | 81 | 26 | 21 | 20 | 39 | 41 | 38 | 35 | 33 | 32 |
| Changes in the test piece (*1) | O | O | O | O | O | X | X | X | X | X | X |

(*1) Changes observed in the test pieces after the test. O: No change X: Cracks observed It can be appreciated from the results shown in Table 1 that the influence of the pH of the rubber on the vulcanization is greater in the case of hydrogenated NBR than in the case of NBR. And it can be seen that there is a marked improvement in the vulcanization properties of hydrogenated NBR when the pH of the rubber is at least 5.

EXAMPLE 2

Example 1 was repeated but using 0.5 part by weight of sulfur, 1.5 parts by weight of tetramethylthiuram but when the pH of the rubber is within the range specified by the present invention, a fully satisfactory state of vulcanization is achieved even when the iodine value is small.

Next, when comparison was made in like manner, except that the vulcanizing system was changed to that used in Example 2, i.e. a sulfur vulcanizing system, the results obtained also tended to be the same as those shown in Tables 3-1 and 3-2.

TABLE 3-1

(pH of rubber = 4.5)

| | Comparative Example Run No. | | | | | | | | |
|---|---|---|---|---|---|---|---|---|---|
| | 1 | 2 | 3 | 4 | 5 | 6 | 7 | 8 | 9 |
| | Iodine value | | | | | | | | |
| | 314 | 164 | 142 | 107 | 101 | 50 | 50 | 24 | 6 |
| Amount of P.O. (part by weight) | 5 | 5 | 5 | 9 | 8 | 8 | 8 | 8 | 8 |
| 160° C. × Vulcanization time (min) | 20 | 20 | 60 | 60 | 60 | 60 | 60 | 60 | 60 |
| Vulcanization Properties | | | | | | | | | |
| Tensile strength (kg/cm$^2$) | 140 | 146 | 76 | 80 | 58 | 37 | 34 | 35 | 38 |
| Elongation (%) | 380 | 390 | 940 | 930 | 870 | 900 | 1140 | 1100 | 1080 |
| Tensile stress at 100% (kg/cm$^2$) | 33 | 30 | 11 | 10 | 12 | 10 | 11 | 10 | 10 |
| Hardness (JIS) | 60 | 60 | 58 | 52 | 51 | 53 | 56 | 55 | 54 |
| Compression set (%) | | | | | | | | | |
| 150° C. × 70 hrs. | 34 | 37 | 65 | 72 | 79 | 83 | 84 | 84 | 87 |
| Changes in the test piece (*1) | X | X | O | O | O | O | O | O | O |
| Air-oven aging test (150° C. × 70 hrs) | | | | | | | | | |
| Change in tensile strength (%) | Could not be measured | −70 | +40 | +53 | +59 | +66 | +82 | +80 | +79 |
| Change in elongation (%) | | −92 | −85 | −74 | −88 | −92 | −80 | −85 | −90 |
| Change in hardness (points) | | +19 | +6 | +7 | +8 | +9 | +11 | +11 | +11 |

(*1) Changes observed in the test pieces after the test. O: No change X: Cracks observed

TABLE 3-2

(pH of rubber = 6.0)

| | Run No. | | | | | | | | | |
|---|---|---|---|---|---|---|---|---|---|---|
| | Comparative Example | | | | Invention Example | | | | | |
| | 10 | 11 | 12 | 13(*1) | 14 | 15 | 16 | 17(*2) | 18 | 19(*3) |
| Properties tested | Iodine value | | | | | | | | | |
| | 314 | 164 | 142 | 107 | 101 | 50 | 35 | 24 | 6 | 72 |
| Amount of P.O. (part by weight) | 5 | 5 | 5 | 8 | 8 | 8 | 8 | 8 | 8 | 8 |
| 160° C. × Vulcanization time (min) | 15 | 15 | 15 | 15 | 15 | 15 | 15 | 15 | 15 | 15 |
| Vulcanization Properties | | | | | | | | | | |
| Tensile strength (kg/cm$^2$) | 138 | 141 | 203 | 258 | 335 | 324 | 381 | 388 | 374 | 336 |
| Elongation (%) | 340 | 340 | 440 | 510 | 420 | 370 | 440 | 430 | 410 | 440 |
| Tensile stress at 100% (kg/cm$^2$) | 36 | 31 | 32 | 33 | 39 | 54 | 70 | 73 | 71 | 42 |
| Hardness (JIS) | 60 | 60 | 62 | 68 | 70 | 73 | 72 | 73 | 73 | 73 |
| Compression set (%) | | | | | | | | | | |
| 150° C. × 70 hrs. | 31 | 39 | 40 | 42 | 22 | 19 | 20 | 20 | 21 | 20 |
| Changes in the test piece (*4) | X | X | O | O | O | O | O | O | O | O |
| Air-oven aging test (150° C. × 70 hrs) | | | | | | | | | | |
| Change in tensile strength (%) | Could not be measured | −65 | −55 | −50 | −7 | −3 | −3 | −3 | −2 | −5 |
| Change in elongation (%) | | −91 | −83 | −80 | −7 | −4 | −3 | −3 | −2 | −6 |
| Change in hardness (points) | | +19 | +10 | +9 | +3 | +1 | +1 | +1 | +1 | +2 |

(*1): Butadiene/butyl acrylate/acrylonitrile (27/32/41 wt. %)terpolymer rubber
(*2): Butadiene/butyl acrylate/acrylonitrile (5/62/33 wt. %)terpolymer rubber
(*3): Hydrogenated product of the terpolymer rubber (*1)
(*4): Changes observed in the test pieces after the test. O: No change X: Cracks observed

What is claimed is:

1. A method for improving compression set of a vulcanizate of a random nitrile group-containing hydrocarbon rubber having an ionine value of not more than 120, said method comprising adjusting the pH of said rubber, as measured in a solution of the rubber in tetrahydrofuran, to at least 5 to about 10, and vulcanizing the pH adjusted rubber using a sulfur vulcanizing system or an organic peroxide curing system.

2. The method of claim 1 wherein the random nitrile group-containing hydrocarbon rubber has an iodine value in the range of from 0 to 80, and wherein the pH of said rubber is adjusted to at least 5.5.

3. The method of claim 1 wherein the random nitrile group-containing hydrocarbon rubber has an iodine value in the range of from 0 to 40 and the pH of said rubber is adjusted to at least 6.

4. The method of claim 1 wherein said pH adjusted rubber is vulcanized at a temperature of about 160° C. for from about 15 to 30 minutes.

* * * * *